W. J. DUNHAM.
CLIP FOR METALLIC FRAMES.
APPLICATION FILED OCT. 20, 1910.
1,000,160. Patented Aug. 8, 1911.
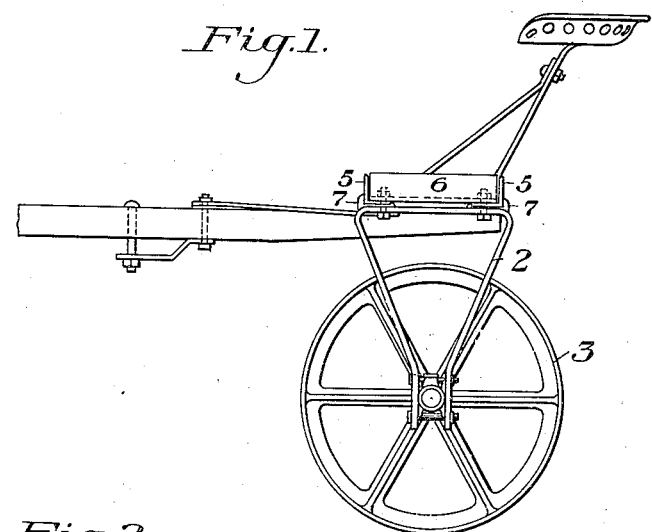
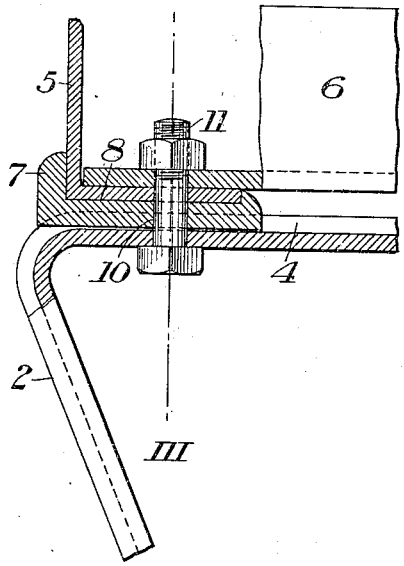
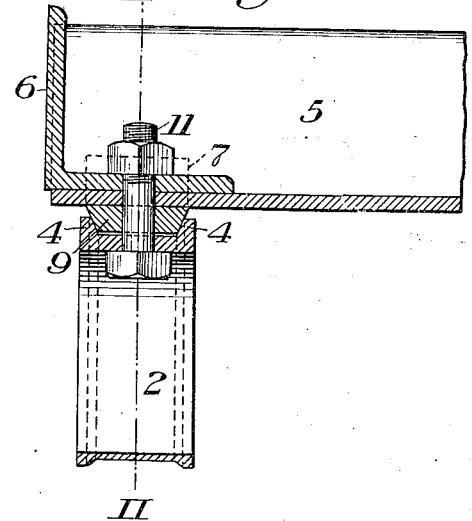
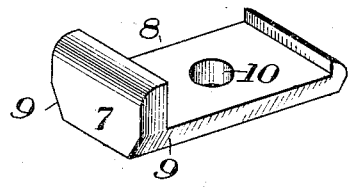
WITNESSES
R A Balderson
W Famariss
INVENTOR
W. J. Dunham
by Bakewell, Byrnes & Parmelee,
his Attys.

UNITED STATES PATENT OFFICE.

WILEY JULIUS DUNHAM, OF BEREA, OHIO, ASSIGNOR TO THE DUNHAM COMPANY, OF BEREA, OHIO, A CORPORATION OF OHIO.

CLIP FOR METALLIC FRAMES.

1,000,160. Specification of Letters Patent. Patented Aug. 8, 1911.

Application filed October 20, 1910. Serial No. 588,205.

*To all whom it may concern:*

Be it known that I, WILEY JULIUS DUNHAM, a resident of Berea, in the county of Cuyahoga and State of Ohio, have invented a new and useful Clip for Metallic Frames, of which the following is a full, clear, and exact description, reference being had to the accompanying drawings, forming part of this specification, in which—

Figure 1 is a side elevation of a land roller with one form of my clip attached. Fig. 2 is a detail sectional view on the line II—II of Fig. 3. Fig. 3 is a sectional view on the line III—III of Fig. 2; and Fig. 4 is a perspective view of the clip.

My invention relates to clips for securing the several members of a metallic frame to each other, and is designed to provide a cheap and simple device for rigidly securing the members of a frame to each other with a minimum number of bolts or rivets.

The precise nature of my invention will be best understood by reference to the accompanying drawings, which will now be described, it being premised, however, that various changes may be made in the details of construction without departing from the spirit and scope of my invention as defined in the appended claims.

In the drawings, the numeral 2 designates the hanger for a roll 3 of a land roller. The hanger is formed of channel iron or steel having outwardly extending tapered flanges 4.

5 are the longitudinal bars of the roller frame, and 6 are the end or transverse bars of said frame. I prefer to form these bars from angle iron or steel, although it will readily be understood that I may use material of any cross-section adapted for the frame to be constructed.

7 is the clip which is provided with a groove 8 on its upper face, and is arranged to receive the base of one of the bars of the frame. The lower portion of the clip is provided with a tapered portion 9 which is adapted to enter the space between the flanges 4 of the hanger 2.

10 is a bolt hole through the clip 7, for the bolt or rivet 11 which also passes through holes in the frame bars and the hanger.

In assembling the frame the clip is seated between the flanges of the hanger. The frame bars which are to be secured to the clip are then placed in position with the base of one of the members seated in the groove 8, so that the holes through all of the several members register with each other. The bolt or rivet 11 is then passed through the several members and its nut is drawn home, which rigidly locks all of the members together. The groove in the clip secures the frame member from rotation on the bolt or rivet, and the tapered portion of the clip prevents rotation of the hanger.

The advantages of my invention result from the provision of a clip having a grooved interlock with frame members at an angle to each other to prevent their rotation about the securing bolt or rivet. By the use of a clip of this character, I am able to form a frame with one bolt or rivet at the junction of the members, and without the use of the usual corner or angular bracing.

I claim:—

1. A frame formed of a plurality of parallel angle bars, a plurality of channel bars at right angles to the angle bars, clips at the junction of the angle and channel bars, said clips having upwardly extending projections on one face forming a groove for the reception of the angle bars, one of said projections being of greater length than the other projection, so as to engage one of the flanges of the angle bar, and a tapered projection on the opposite face of each clip member arranged to be seated in the grooves of the channel bars; substantially as described.

2. A frame formed of a plurality of parallel longitudinally disposed angle bars, a clip at the end of each bar having a groove in its upper face for the reception of the base of said bars, a tapered portion on the bottom of each clip, a transverse member at each end of the frame having a groove for engaging the tapered portion of the clips, and fastening means for each of said clips, said fastening means passing through their respective clips, angle bars and transverse members; substantially as described.

In testimony whereof, I have hereunto set my hand.

WILEY JULIUS DUNHAM.

Witnesses:
B. M. MALEY,
C. A. EHRBAR.